(No Model.)

G. W. MILLER.
BELT SHIFTER.

No. 370,153. Patented Sept. 20, 1887.

Witnesses

Geo. W. Miller,
Inventor,

By his Attorneys Foster & Freeman

UNITED STATES PATENT OFFICE.

GEORGE WILLIAM MILLER, OF WOONSOCKET, RHODE ISLAND.

BELT-SHIFTER.

SPECIFICATION forming part of Letters Patent No. 370,153, dated September 20, 1887.

Application filed December 21, 1886. Serial No. 222,204. (No model.)

*To all whom it may concern:*

Be it known that I, GEORGE WILLIAM MILLER, a citizen of the United States, residing at Woonsocket, Providence county, Rhode Island, have invented certain new and useful Improvements in Belt-Shifters, of which the following is a specification.

My invention relates to that class of stopping and starting devices for machinery in which a belt is shifted to and from a fixed pulley and a loose pulley upon a shaft; and my invention consists of an ordinary shifting-bar combined with bearings and supports therefor, and means whereby said bearings may be secured in different positions upon said supports, so as to enable the shifting-bar to be readily placed in any desired operative position in respect to the driving-belt.

Figure 1:
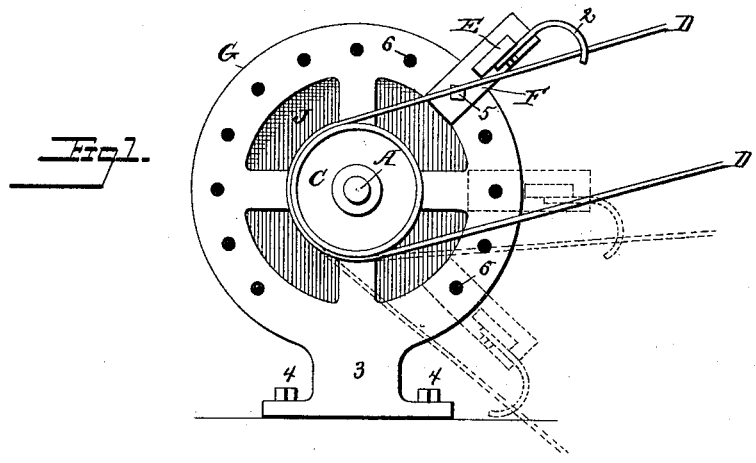
Figure 2:
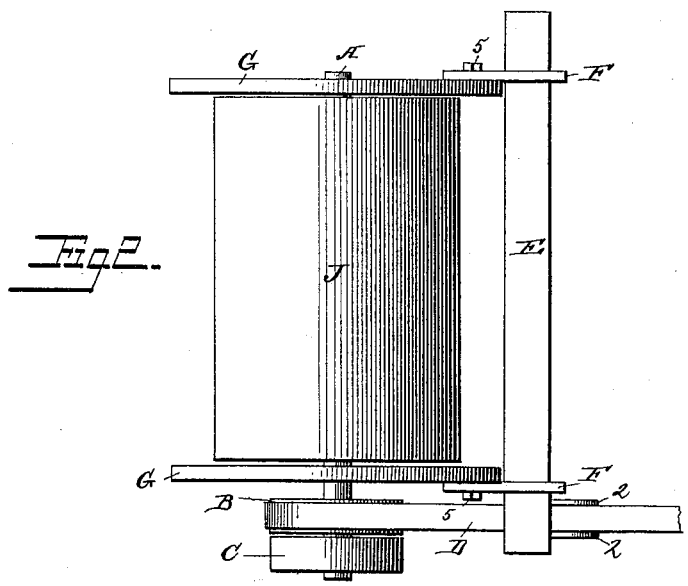
Figure 3:
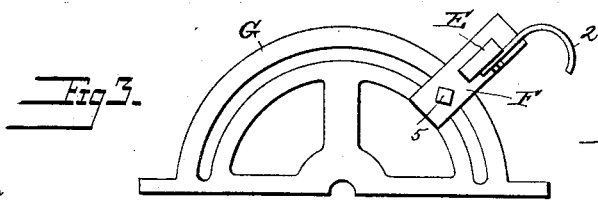

In the drawings, Figure 1 is a side elevation showing a shaft, pulleys, shifting-bar, and adjustable supports therefor and embodying my invention. Fig. 2 is a plan of Fig. 1. Fig. 3 is a modified form of bracket for supporting the shifting-bar bearings.

A represents a shaft supporting the driving-pulley B and the loose pulley C, round which the driving-belt D passes, and upon which it is to be shifted by means of the usual shifting-bar, E, provided with the extended fingers 2 2, between which passes the belt.

The shifting-bar E is supported in two adjustable bearings, F F, each having a slot or other suitable guide for the reception and support of the bar, and each bearing F is adjustably secured to a curved or circular bracket, G, provided with means whereby the bearing can be set at different points in respect to the axis of the shaft A.

In Figs. 1 and 2 the brackets G are circular, and each is provided with a neck, 3, and flanges 4, with openings for the passage of bolts, by means of which the bracket may be secured in the desired position, with its circular portion concentric with the shaft A, the two brackets being arranged upon opposite sides of a roller, J, supported by said shaft, and, if desired, the said brackets may support the bearings for the journals of said shaft.

Each bearing F consists of a flat plate with an opening for the passage of the bar E, and with another opening for the passage of a screw-bolt, 5, and each bracket G is provided with a series of holes, 6, to receive said bolt 5, in order to bolt the bearing-plate F in any desired position upon the said bracket.

The positions of the brackets will of course depend upon the position of the shifting-bar, which must be arranged so that the fingers 2 2 will receive between them one portion of the belt D, against which the fingers will bear after the bar is shifted, thereby transferring the belt from one pulley to the other. It will be seen that by the above-described arrangement of adjustable guides and supports therefor the position of the driving-belt in respect to a machine may be readily changed without any alterations in the permanent bearings of the machine, and that the shifter can be applied to the belt in any desired position. This contrivance is especially adapted for use upon machines built for general sale and without regard for any particular location, permitting the same to be erected in respect to driving-shafts in any position without any material alterations.

The brackets G may be curved instead of circular, as shown in Fig. 3, and the openings for the passage of the bolts or other securing devices 5 may be in the form of continuous channels or slots. It will also be evident that the forms of the bearing-pieces F and methods of connection with their supports may be varied according to circumstances, and that the supports or brackets G may be bolted to the frame of the machine or may form part thereof.

Without limiting myself to the precise construction and arrangement of parts shown, I claim—

1. The combination, with the shaft and pulleys mounted thereon, of independent supports adjacent to the shaft, bearing-plates, means for adjustably securing said plates to the supports near the periphery of the latter, and a shifting-bar movably supported by said bearing-plates and carrying fingers, substantially as described.

2. The combination, with a shaft provided with pulleys, of independent curved supports adjacent to said shaft, bearing-plate secured to said supports near the periphery thereof, means for adjusting the bearing-plates upon the supports, and a shifting-bar movably supported by said bearing-plates, substantially as and for the purpose set forth.

In testimony whereof I have signed my name to this specification in the presence of two subscribing witnesses.

GEORGE WILLIAM MILLER.

Witnesses:
HENRY L. BALLOU,
S. G. SMITH.